(12) United States Patent
Araki et al.

(10) Patent No.: US 12,315,394 B2
(45) Date of Patent: May 27, 2025

(54) CHEATING ESTIMATION DEVICE, CHEATING ESTIMATION METHOD, AND RECORDING MEDIUM

(71) Applicant: OMRON Corporation, Kyoto (JP)

(72) Inventors: Sakuya Araki, Muko (JP); Yoshihiro Hirai, Muko (JP); Yusuke Akino, Muko (JP); Hirofumi Ota, Muko (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/660,206

(22) Filed: May 9, 2024

(65) Prior Publication Data

US 2024/0428701 A1    Dec. 26, 2024

(30) Foreign Application Priority Data

Jun. 26, 2023   (JP) ................. 2023-103867

(51) Int. Cl.
*G09B 7/02* (2006.01)
*G06F 9/54* (2006.01)
*G06Q 50/20* (2012.01)

(52) U.S. Cl.
CPC ............... *G09B 7/02* (2013.01); *G06F 9/543* (2013.01); *G06Q 50/20* (2013.01)

(58) Field of Classification Search
CPC ............ G09B 7/02; G06F 9/543; G06Q 50/20
See application file for complete search history.

(56) References Cited

U.S. PATENT DOCUMENTS

| | | | |
|---|---|---|---|
| 10,964,224 B1* | 3/2021 | Zhang | G09B 19/00 |
| 2011/0223576 A1* | 9/2011 | Foster | G09B 7/02 |
| | | | 434/362 |
| 2012/0244508 A1* | 9/2012 | Katz | G09B 7/00 |
| | | | 434/362 |
| 2020/0175885 A1* | 6/2020 | Lelo | G09B 7/00 |
| 2021/0374391 A1* | 12/2021 | Jorasch | G06V 40/19 |
| 2021/0407310 A1* | 12/2021 | Finch | G06F 40/40 |
| 2022/0392226 A1* | 12/2022 | Li | G06V 40/20 |
| 2024/0046392 A1* | 2/2024 | Tudela | H04L 67/535 |
| 2024/0321132 A1* | 9/2024 | Juola | G06V 40/20 |

FOREIGN PATENT DOCUMENTS

| | | |
|---|---|---|
| CN | 112308417 | 2/2021 |
| JP | 2022052144 | 4/2022 |

OTHER PUBLICATIONS

"Search Report of Europe Counterpart Application", issued on Nov. 5, 2024, pp. 1-15.

* cited by examiner

*Primary Examiner* — Jack Yip
(74) *Attorney, Agent, or Firm* — JCIPRNET

(57) ABSTRACT

The disclosure provides a cheating estimation device including an answer acquisition part acquires a character string input into an answer column of a question as an answer; an operation history information acquisition part acquires operation history information indicating an operation history of an input operation of the answer to the answer column; and an estimation part estimates whether cheating has been committed in the answer to the question based on the operation history information acquired by the operation history information acquisition part.

7 Claims, 12 Drawing Sheets

---

Please translate the following Japanese into English.

「ジョン!こんにちは、お元気ですか？」

Answer  Hello ! John, How are you?

Please translate the following Japanese into English.

「ジョン!こんにちは、お元気ですか？」

Answer: [          ]

FIG.2A

Please translate the following Japanese into English.

「ジョン!こんにちは、お元気ですか？」

Answer: [ Hello ! ]

FIG.2B

Please translate the following Japanese into English.

「ジョン!こんにちは、お元気ですか？」

Answer: [ Hello ! John, How are you? ]

FIG.2C

| Question No | 0123456789 | | | |
|---|---|---|---|---|
| Operation date and time | Operation type | Input character | ◎◎◎ | |
| 2023/07/07 t1/m1/s1 | focus end | | ◎◎◎ | |
| 2023/07/07 t2/m2/s2 | focus start | | ◎◎◎ | |
| 2023/07/07 t3/m3/s3 | copy | | ◎◎◎ | |
| 2023/07/07 t4/m4/s4 | paste | hello | ◎◎◎ | |
| 2023/07/07 t5/m5/s5 | focus end | | ◎◎◎ | |
| 2023/07/07 t6/m6/s6 | focus start | | ◎◎◎ | |
| ◎◎◎ | ◎◎◎ | ◎◎◎ | ◎◎◎ | |

FIG.5

| Question No | 0123456789 | | | |
|---|---|---|---|---|
| Operation date and time | Operation type | Input character | ◎◎◎ | |
| 2023/07/07 t1/m1/s1 | focus end | | ◎◎◎ | |
| 2023/07/07 t2/m2/s2 | focus start | | ◎◎◎ | |
| 2023/07/07 t4/m4/s4 | paste | hello | ◎◎◎ | |
| 2023/07/07 t5/m5/s5 | focus end | | ◎◎◎ | |
| 2023/07/07 t6/m6/s6 | focus start | | ◎◎◎ | |
| ◎◎◎ | ◎◎◎ | ◎◎◎ | ◎◎◎ | |

FIG.6

| Question No | 0123456789 | | | |
|---|---|---|---|---|
| Operation date and time | Operation type | Input character | ⊙ ⊙ ⊙ | |
| 2023/07/07  t1/m1/s1 | focus start | | ⊙ ⊙ ⊙ | |
| 2023/07/07  t2/m2/s2 | key-down | h | ⊙ ⊙ ⊙ | |
| 2023/07/07  t3/m3/s3 | key-down | e | ⊙ ⊙ ⊙ | |
| 2023/07/07  t4/m4/s4 | key-down | l | ⊙ ⊙ ⊙ | |
| 2023/07/07  t5/m5/s5 | key-down | l | ⊙ ⊙ ⊙ | |
| 2023/07/07  t6/m6/s6 | key-down | o | ⊙ ⊙ ⊙ | |
| ⊙ ⊙ ⊙ | ⊙ ⊙ ⊙ | ⊙ ⊙ ⊙ | ⊙ ⊙ ⊙ | |

FIG.7

CHEATING ESTIMATION DEVICE, CHEATING ESTIMATION METHOD, AND RECORDING MEDIUM

CROSS-REFERENCE TO RELATED APPLICATION

This application claims the priority benefit of Japan application serial no. 2023-103867, filed on Jun. 26, 2023. The entirety of the above-mentioned patent application is hereby incorporated by reference herein and made a part of this specification.

TECHNICAL FIELD

The disclosure relates to a technology for conducting tests to determine and evaluate a user's knowledge and academic ability by utilizing an information processing device.

BACKGROUND

Conventionally, a CBT (Computer Based Testing) is one of the methods of conducting a test in which a user operates an information processing device to determine and evaluate the knowledge and academic ability of the user. In the CBT, test questions are displayed on the display screen of the information processing device operated by the test taker (user). The user performs an input operation on the information processing device to input an answer to the test question displayed on the display screen. The user's knowledge and academic ability are determined based on the scoring of the user's answers. The information processing device used in the CBT is, for example, a personal computer or a tablet terminal.

A system has also been proposed that monitors cheating by the CBT test takers (users) (see Patent Document 1, Japanese Patent Application Laid-Open (JP-A) No. 2022-52144). The system in Patent Document 1 processes the image of the test taker taken with the camera provided by the information processing device, detects changes in the test taker's gaze and behavior of leaving his/her seat, and based on these results, determines whether the test taker has been cheating.

However, the system described in Patent Document 1 does not monitor cheating using a Web browser installed in the information processing device or cheating using files stored in the information processing device.

Cheating using a Web browser involves, for example, performing a web search using a keyword obtained from a presented question sentence as a search word and providing an answer by referring to the searched web page. Moreover, cheating using a file stored in the information processing device is, for example, cheating in which an answer is given by referring to a file (corresponding to a so-called cheat sheet) that has been stored in advance in the information processing device.

Furthermore, it is being considered to implement the CBT in a form where test takers use personally owned information processing devices. In this form, there is no need for the CBT operator to prepare an information processing device to be lent to each test taker, thereby reducing implementation costs. Thus, there is a demand for the development of a system capable of monitoring the above-mentioned cheating of test takers.

The disclosure provides a technology capable of monitoring cheating using a Web browser and stored files.

SUMMARY

The cheating estimation device of the disclosure is configured as follows.

An answer acquisition part acquires a character string input into an answer column of a question as an answer. An operation history information acquisition part acquires operation history information indicating an operation history of an input operation of the answer to the answer column. An estimation part estimates whether cheating has been committed in the answer to the question based on the operation history information acquired by the operation history information acquisition part.

For example, the operation history information acquisition part acquires a history in which a character string input into the answer column is associated with an input operation (paste operation or character keying operation) of the character string. For example, the estimation part detects a character string input by a paste operation in the answer column and estimates whether the input of the character string is conducted by cheating. For example, in the case where the character string input by a paste operation in the answer column is not copied within the window presenting the question, does not exist within the window presenting the question, etc., the estimation part estimates that cheating has been committed in answering the question.

In this way, cheating by a user (test taker) who answers by pasting character strings copied from a web page searched with a Web browser or from a saved file (cheating file) into the answer column may be monitored.

The cheating estimation device may include a transition history information acquisition part that acquires transition history information indicating a transition history in which a window presenting the question transitioned between an active state where the window is being focused and an inactive state where the window is out of focus, and may be configured such that the estimation part estimates whether cheating has been committed in the answer to the question based on the transition history information acquired by the transition history information acquisition part. For example, the estimation part may estimate whether cheating has been committed in the answer to the question by comparing a frequency at which the window presenting the question transitions from the active state to the inactive state or from the inactive state to the active state with a preset threshold value.

In this way, cheating by a user (test taker) who answers by inputting characters into the answer column by a character keying operation while referring to a web page searched with a Web browser and a saved file (cheating file) may be monitored.

BRIEF DESCRIPTION OF THE DRAWINGS

FIG. 2A is a diagram showing an example of a screen of a window in which a user terminal displays a question distributed from a server device; FIG. 2B is a diagram showing an example of a screen of a window when inputting an answer to a question distributed from the server device; and FIG. 2C is a diagram showing an example of a screen of a window when the input of the answer to the question distributed from the server device is completed.

FIG. 5 is a diagram showing operation history information.

FIG. 6 is a diagram showing operation history information.

FIG. 7 is a diagram showing operation history information.

DETAILED DESCRIPTION

According to the disclosure, cheating using a Web browser and cheating using a saved file may be monitored.

Hereinafter, the embodiments of the disclosure are described.

1. Application Example

Figure 1:
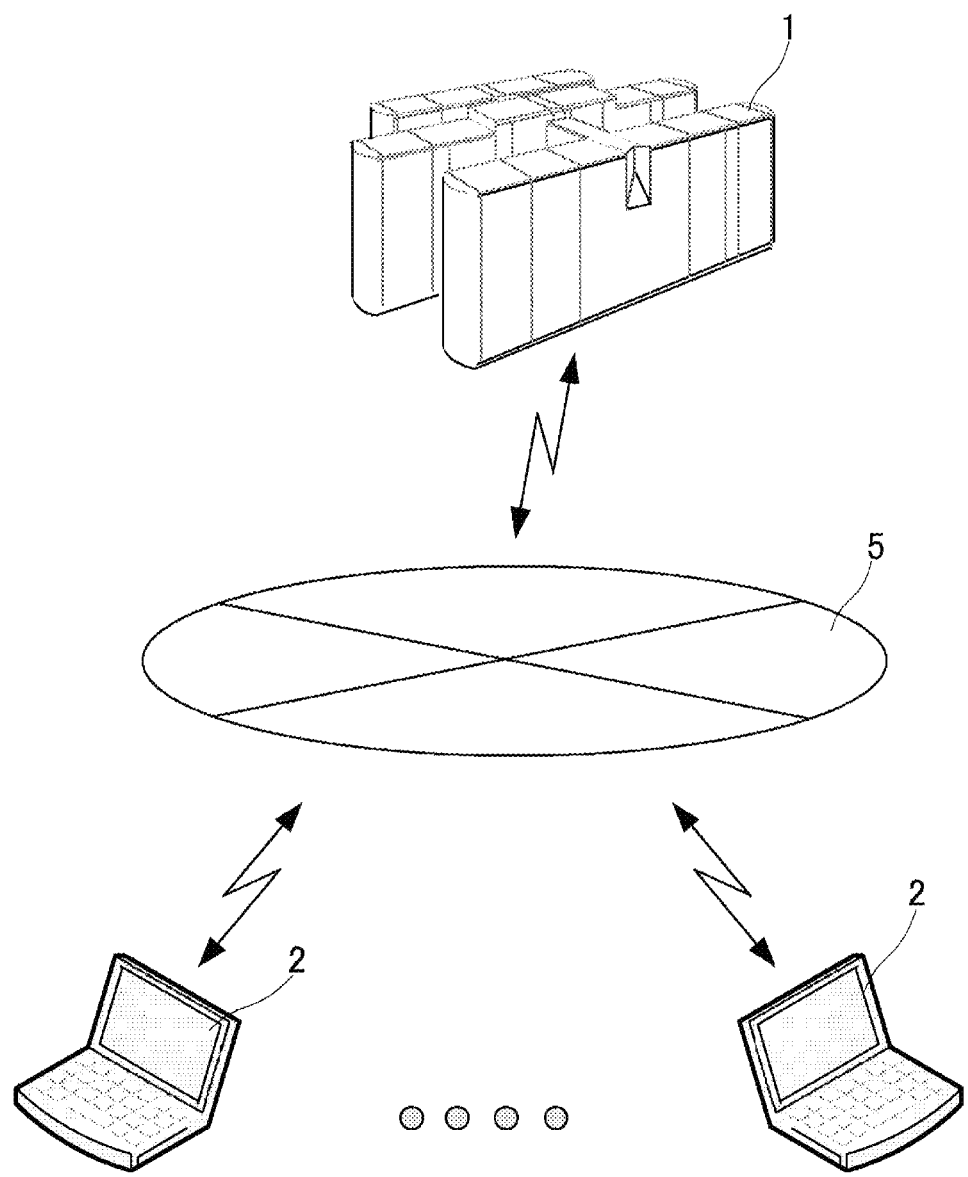
FIG. 1 is a schematic diagram showing the network system for implementing a CBT (Computer Based Testing).

FIG. 1 is a schematic diagram showing the network system for implementing a CBT (Computer Based Testing). As shown in FIG. 1, the network system of this example has a configuration in which a plurality of user terminals 2 are connected to a server device 1 via a network 5 so as to be capable of data communication. This example is an example in which the cheating estimation device according to the disclosure is applied to the server device 1.

It is noted that, as described in a Modification Example below, the cheating estimation device according to the disclosure may also be applied to the user terminal 2 instead of the server device 1.

The user terminal 2 is a personal computer or a tablet terminal operated by a user (test taker) taking a test conducted using the CBT method. In this example, the user terminal 2 may be a terminal owned by the user, or may be a terminal lent to the test taker by the CBT operator. In other words, in this example, the user may take the CBT on the user terminal 2 which he/she owns. In addition, users may take the CBT in their own personal space, such as their own home, rather than at a testing venue. In the case where the CBT operator has the user take the test using the user terminal 2 that the user owns, there is no need to prepare the user terminal 2 to be lent to the user who is the test taker. The CBT operator does not need to prepare a test venue when allowing users to take the test in their personal space.

In this example, the server device 1 distributes (transmits) test questions to a user terminal 2 operated by a user. In addition, the server device 1 scores the user's answers transmitted from the user terminal 2 and estimates whether the user is cheating.

For example, the server device 1 distributes a question 'Please translate the following Japanese into English. "ジョン、こんにちは、お元気ですか?"' to the user terminal 2. The user terminal 2 is a commonly used information processing terminal (such as a personal computer or a tablet terminal) and is capable of displaying not only the window related to CBT but also multiple windows on the display thereof. A window, as is well known, is a region of the screen display created by the application that allocated the window. For example, there are windows related to the CBT, windows related to web pages, windows related to saved files, etc. The user terminal 2 accepts a user's input operation for a focused window (active window).

FIG. 2A is a diagram showing an example of a screen of a window in which a user terminal displays a question distributed from a server device. The windows shown in FIGS. 2A, 2B, and 2C are windows that related to the CBT. The user operates an input device (a mouse, a keyboard, a touch panel, etc.) of the user terminal 2 to answer the question distributed from the server device 1 (input the answer in the answer column).

FIG. 2B is a diagram showing an example of a screen of a window when inputting an answer to a question distributed from the server device, and FIG. 2C is a diagram showing an example of a screen of a window when the input of the answer to the question distributed from the server device is completed. FIG. 2B shows the time point when the user inputs "Hello!" into the answer column, and FIG. 2C shows the time point when the user inputs "Hello! John, How are you?" into the answer column.

The user terminal 2 acquires input operation information indicating the contents of input operations performed by the user on the window related to the CBT and generates operation history information in which the acquired input operation information is arranged in chronological order. For example, when a character string is input into the answer column, the user terminal 2 acquires input operation information including the type of input operation at that time (character keying operation, paste operation, etc.) and the character string input into the answer column. In addition, even when no character string is input into the answer column, when, for example, a copy operation or an operation related to switching the focus on a window related to the CBT is performed, the user terminal 2 acquires input operation information indicating the operation.

The user terminal 2 transmits to the server device 1 the user's answer to the question (the character string input into the answer column) and the operation history information at the time of answering the question.

The server device 1 scores the user's answer received from the user terminal 2. Furthermore, based on the operation history information received from the user terminal 2, the server device 1 estimates whether or not the user (test taker) operating the user terminal 2 is cheating. For example, the server device 1 estimates whether the input of the character string by a paste operation is conducted by cheating, based on whether the character string input into the answer column by a paste operation is the copied character string in the window presenting the question (window related to the CBT). By performing this estimation, the server device 1 monitors whether the user is cheating using a Web browser or a saved file.

2. Configuration Example

Figure 3:
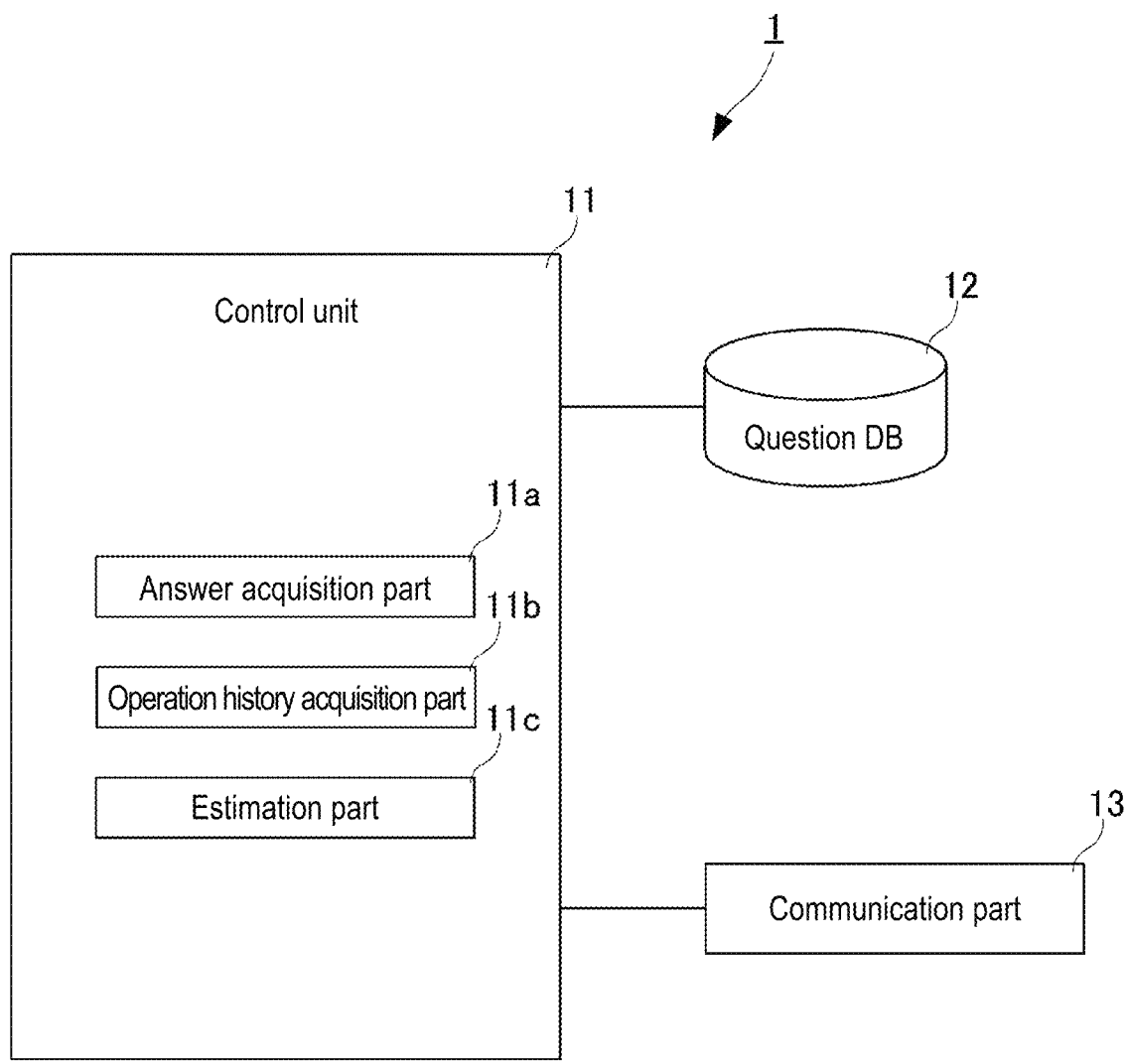
FIG. 3 is a block diagram showing the configuration of the main parts of the server device.

FIG. 3 is a block diagram showing the configuration of the main parts of the server device in this example. The server device 1 includes a control unit 11, a question database 12 (question DB 12), and a communication part 13.

The control unit 11 controls each part of the main body of the server device 1. The control unit 11 includes an answer acquisition part 11a, an operation history acquisition part 11*b*, and an estimation part 11*c*. The answer acquisition part 11*a*, the operation history acquisition part 11*b*, and the estimation part 11*c* included in the control unit 11 will be described later.

The question DB 12 is a data base in which questions to be distributed to the user terminal 2 operated by the user are stored. In this example, the question DB 12 stores a correct answer (model answer) for each question in association with the question.

The communication part 13 performs data communication via the network 5 with the user terminal 2 operated by the user. The question is transmitted (distributed) to the user terminal 2 in the communication part 13. Further, the communication part 13 receives the answer to the question from the user terminal 2 and the operation history information at the time of answering the question.

Next, the answer acquisition part 11*a*, the operation history acquisition part 11*b*, and the estimation part 11*c* included in the control unit 11 will be described.

The answer acquisition part 11*a* acquires the answer to the question (user's answer) received from the user terminal 2 in the communication part 13. Further, the answer acquisition part 11*a* scores the acquired user's answer.

The operation history acquisition part 11*b* acquires the operation history information received from the user terminal 2 in the communication part 13. The operation history information will be described later.

The estimation part 11*c* estimates whether there is a high possibility that the user has been cheating when answering the question, based on the operation history information acquired by the operation history acquisition part 11*b*.

In this example, the control unit 11 of the server device 1 includes a hardware CPU, a memory, and other electronic circuits. When the hardware CPU executes the cheating estimation program according to the disclosure, it operates as the answer acquisition part 11*a*, the operation history acquisition part 11*b*, and the estimation part 11*c*. Further, the memory has a region for expanding the cheating estimation program according to the disclosure and a region for temporarily storing data generated during execution of the cheating estimation program. The control unit 11 may be an LSI that integrates a hardware CPU, a memory, and the like. In this example, the hardware CPU is a computer that executes the cheating estimation method according to the disclosure.

Figure 4:
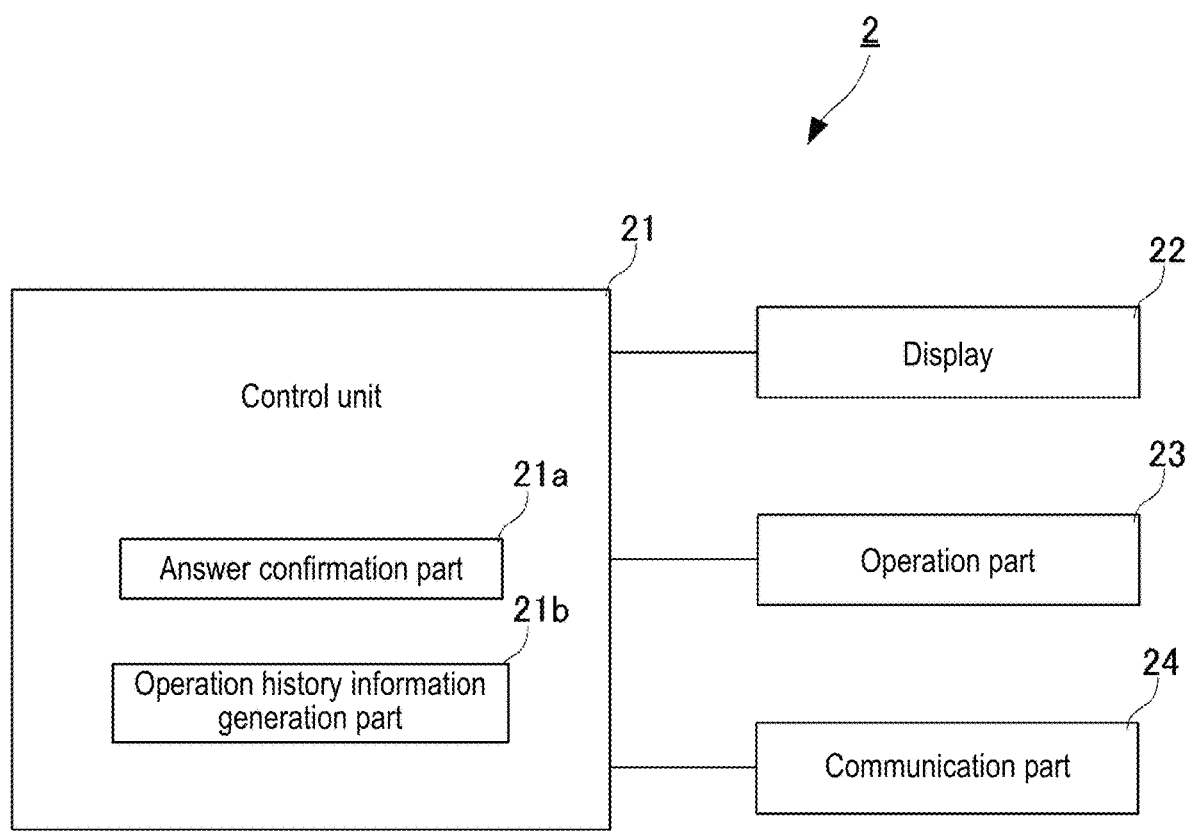
FIG. 4 is a block diagram showing the configuration of the main parts of the user terminal.

FIG. 4 is a block diagram showing the configuration of the main parts of the user terminal in this example. The user terminal 2 includes a control unit 21, a display 22, an operation part 23, and a communication part 24.

The control unit 21 controls the operation of each part of the main body of the user terminal 2. Further, the control unit 21 has an answer confirmation part 21*a* and an operation history information generation part 21*b*. The answer confirmation part 21*a* and the operation history information generation part 21*b* included in the control unit 21 will be described later.

The display 22 displays the question distributed from the server device 1, the answer to the question input by the user, and the like.

The operation part 23 detects the input operation of the user. The operation part 23 may be configured to accept character input via a hardware keyboard or a software keyboard. The operation part 23 may also have a pointing device such as a mouse.

The communication part 24 performs data communication with the server device 1 via the network 5.

Next, the answer confirmation part 21*a* and the operation history information generation part 21*b* included in the control unit 21 will be described.

The answer confirmation part 21*a* confirms, when an input operation for completing an answer is performed for a question displayed on the display 22, a character string input into the answer column as the answer to the question.

The operation history information generation part 21*b* generates operation history information in which input operation information at the time of answering a question is arranged in chronological order. FIG. 5, FIG. 6 and FIG. 7 are diagrams showing operation history information. The Question No shown in FIG. 5 to FIG. 7 are numbers that identify the question (question identification number). In FIG. 5 to FIG. 7, the Question No are given the same number to illustrate that the operation history information generated differs based on the user's input operation.

Each line of the operation history information is input operation information indicating the contents of an input operation performed by a user on a window in the CBT. The input operation information includes the operation date and time, the operation type, and the input characters. The operation date and time indicates the date and time when the input operation was performed. The operation type is, for example, an operation to unfocus from the window related to the CBT (focus end), an operation to focus on the window related to the CBT (focus start), a copy operation (copy) to save a character string to the clipboard, a paste operation (paste) to paste a character string saved in the clipboard, and a character keying operation (key-down). The input characters are the characters (or character string) input into the answer column. There are operation types in which no characters are input into the answer column, and there are operation types in which multiple characters (character strings) are input into the answer column.

The control unit 21 of the user terminal 2 includes a hardware CPU, a memory, and other electronic circuits. The hardware CPU operates as the answer confirmation part 21*a* and the operation history information generation part 21*b*. Further, the memory has a region for temporarily storing the character string input into the answer column and the operation history information. The control unit 21 may be an LSI that integrates a hardware CPU, a memory, and the like.

3. Operational Example

Figure 8:
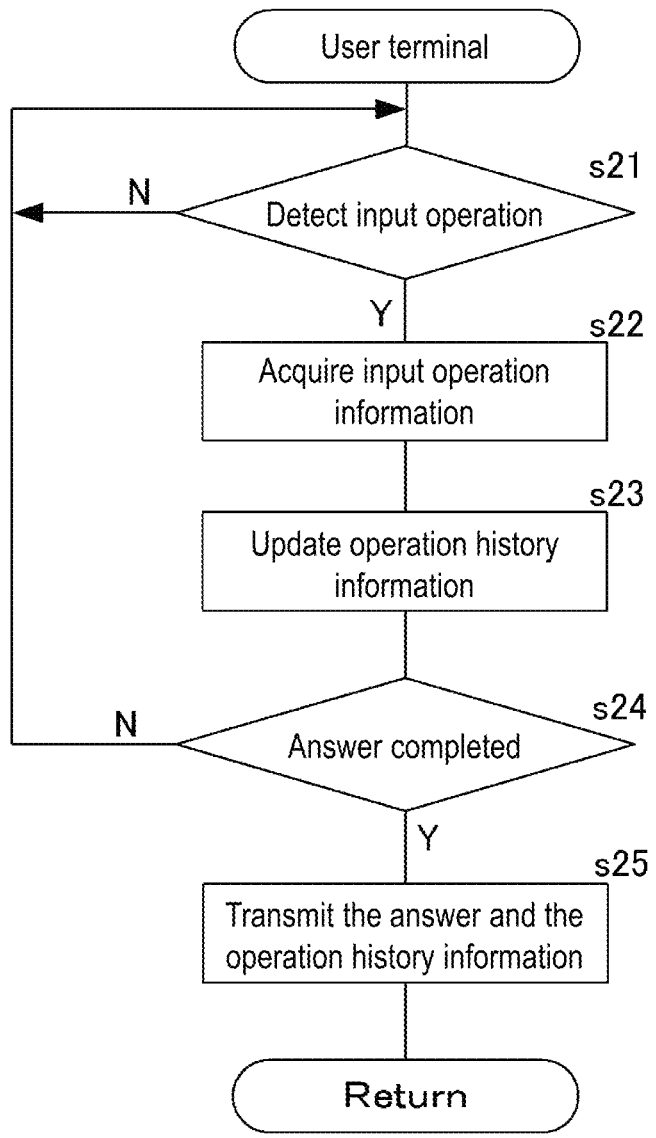
FIG. 8 is a flowchart showing the operation of the user terminal in this example.
Figure 9:
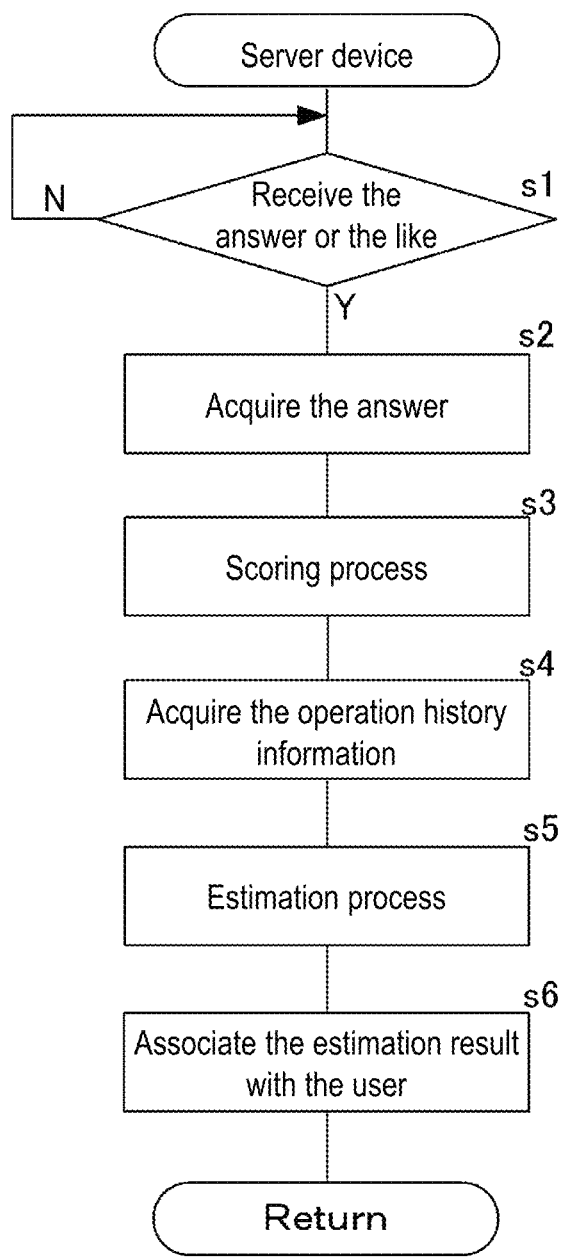
FIG. 9 is a flowchart showing the operation of the server device in this example.

FIG. 8 is a flowchart showing the operation of the user terminal in this example. FIG. 9 is a flowchart showing the operation of the server device in this example.

The server device 1 transmits the question to each user terminal 2. The user terminal 2 displays the question received from the server device 1 in the window related to the CBT.

When the user terminal 2 detects that the user has performed an input operation for the window related to the CBT, the user terminal 2 acquires the input operation information related to the input operation (s21, s22). As described above, the input operation is, for example, an operation to unfocus from the window related to the CBT (focus end), an operation to focus on the window related to the CBT (focus start), a copy operation (copy) to save a character string to the clipboard, a paste operation (paste) to paste a character string saved in the clipboard, and a character keying operation (key-down).

When the window in which the user performed the input operation is a window other than the window related to the CBT the user terminal 2 does not perform the process from s22 onwards. ther, when the window in which the user performed the input operation is a window related to the CBT, and when the input operation is to input characters related to the answer into the answer column of a question, the user terminal 2 inputs the characters corresponding to the input operation into the answer column.

When the user terminal 2 acquires the input operation information related to the current input operation in s22, the operation history information is updated (s23). In s23, the input operation information related to the current input operation acquired in s22 is added to the operation history information.

The user terminal 2 determines whether the user has completed the answer to the question (s24), and in the case where the answer has not been completed, returns to s21. When the user completes the answer to the question, the user terminal 2 transmits the answer to the question and the operation history information related to this question to the server device 1 (s25), and returns to s21. At the time point when it is determined that the user has completed the answer to the question, the user terminal 2 acquires the character string input into the answer column of the question as the answer. In s25, the user terminal 2 transmits individual identification information capable of identifying the operating user to the server device 1. The individual identification information may be, for example, the test taking number assigned to the user in this CBT, an IP address, or the like.

Next, the operation of the server device 1 will be described. The server device 1 waits to receive the answer to the question and the operation history information related to the question from the user terminal 2 at the communication part 13 (s1). When the server device 1 receives the answer to the question and the operation history information related to the question from the user terminal 2, the answer acquisition part 11a acquires the received answer to the question and scores the answer (s2, s3). The scoring of the answer in s3 may be performed, for example, by a point subtraction method or a point addition method, or by other methods, or by a scoring method utilizing AI (artificial intelligence).

Moreover, the operation history acquisition part 11b acquires the operation history information received from the user terminal 2 (s4). The estimation part 11c performs an estimation process to estimate whether there is a high possibility that the user has been cheating when answering the question (s5), based on the operation history information acquired by the operation history acquisition part 11b in s4. The estimation part 11c associates the estimation result in s5 with the user (s6), and returns to s1.

Figure 10:
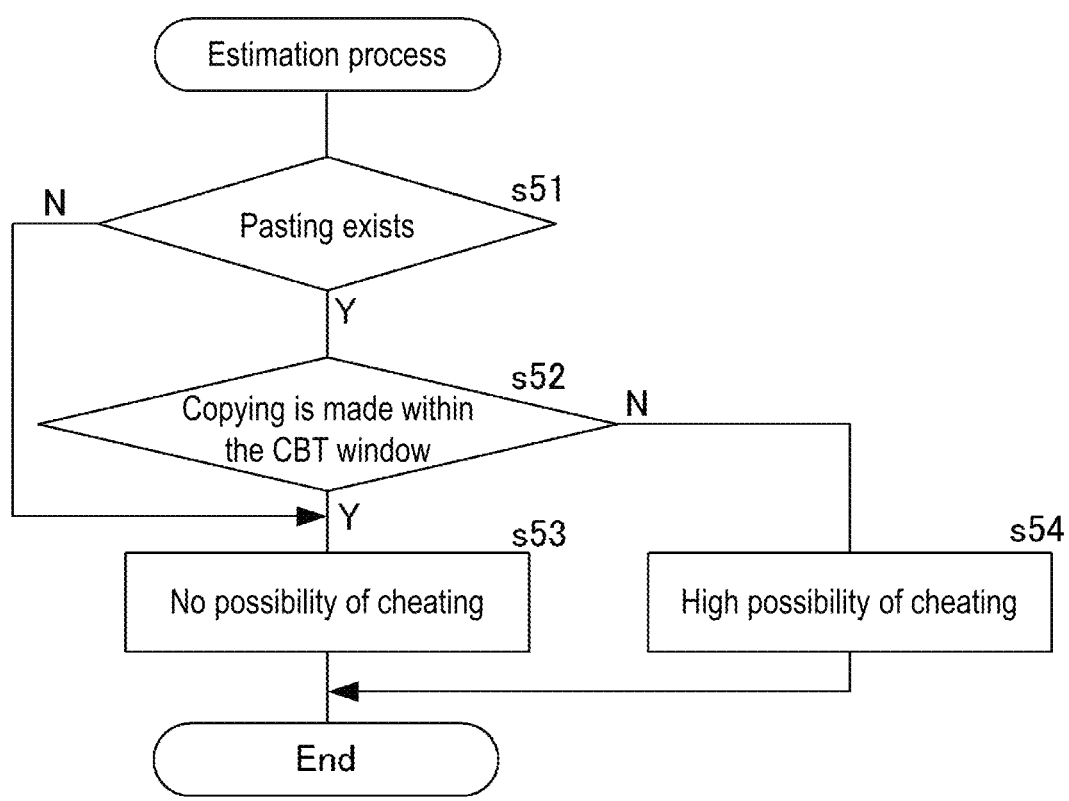
FIG. 10 is a flowchart showing an estimation process.

The estimation process in s5 will be described. FIG. 10 is a flowchart showing the estimation process. The estimation part 11c determines whether or not there is a character string input by a paste operation in the character strings input into the answer column (s51). The estimation part 11c extracts all character strings input into the answer column by a paste operation. The estimation part 11c refers to the operation history information and extracts the input operation information in which the operation type is paste.

When there is no character string input by a paste operation in the character string input into the answer column, the estimation part 11c estimates that there is no possibility that the user has been cheating when answering this question (s53) and ends this process.

When there is a character string input by a paste operation in the character strings input into the answer column, the estimation part 11c determines whether or not the copy of the character string (the character string input into the answer column by a paste operation) was made within the window related to the CBT (s52).

For example, in s52, the estimation part 11c refers to the operation history information and detects an operation (focus start) that focuses on the window related to the CBT that is earlier than the target paste operation and temporally closest to the target paste operation. The estimation part 11c determines whether there is a copy operation between the operation of focusing on the window related to the CBT detected and the target paste operation. When there is a copy operation between the operation of focusing on the window related to the CBT detected and the target paste operation, the estimation part 11c estimates that there is no possibility that the user has been cheating (s53) and ends this process. On the other hand, when there is no copy operation between the operation of focusing on the window related to the CBT detected and the target paste operation, the estimation part 11c estimates that there is a high possibility that the user has been cheating (s54) and ends this process.

When there is no copy operation between the operation of focusing on the window related to the CBT detected and the target paste operation, there is a high possibility that the character string pasted by the target paste operation is not a character string copied in the window related to the CBT, but a character string copied in a window other than the CBT. When the character string pasted by the target paste operation is likely to be a character string copied in a window other than the CBT, the estimation part 11c estimates that there is a high possibility that the user has been cheating.

It is noted that the estimation part 11c performs the process shown in FIG. 10 for each character string input into the answer column by a paste operation, and in the case where it is estimated in s54 that there is a high possibility that the user has been cheating with respect to at least one character string, it is estimated that there is a high possibility that the user has been cheating in that question. In other words, when there is no character string input by a paste operation in the answer column, or when it is estimated in s53 that there is no possibility that the user has been cheating regarding all character strings input by a paste operation in the answer column, the estimation part 11c estimates that there is no possibility that the user has been cheating in that question.

In this way, the server device 1 of the network system in this example monitors whether or not the user is cheating based on whether the character string input into the answer column by a paste operation is the character string copied in the window related to the CBT. Thus, the network system in this example may monitor cheating using a Web browser installed in the user terminal 2 and cheating using files stored in the information processing device. In addition, the CBT may be conducted in a form that allows test takers to use their own terminals (user terminals 2), thereby reducing the cost of implementing the CBT.

4. Modification Example

Modification Example 1

In the above example, the estimation part 11c is configured to estimate whether there is a possibility that the user has been cheating based on whether there is a copy operation between the operation of focusing on the window related to the CBT detected and the target paste operation.

In this Modification Example 1, when there is a character string input into the answer column by a paste operation, the estimation part 11c estimates whether or not there is a possibility that the user has been cheating based on whether the character string (the character string input into the answer column by a paste operation) is the character string displayed in the window related to the CBT. For example, the estimation part 11c estimates that there is no possibility that the user has been cheating in the case where the character string input into the answer column by a paste operation is present in the character string displayed in the window related to the CBT (e.g., the character string in the question sentence). In other words, the estimation part 11c estimates that there is a high possibility that the user has been cheating in the case where the character string input into the answer column by a paste operation is not present in the character string displayed in the window related to the CBT (e.g., the character string in the question sentence).

In this way, it is possible to monitor whether a user is cheating by checking whether the character string input into the answer column by a paste operation is the character string displayed in the window related to the CBT.

Modification Example 2

Figure 11:
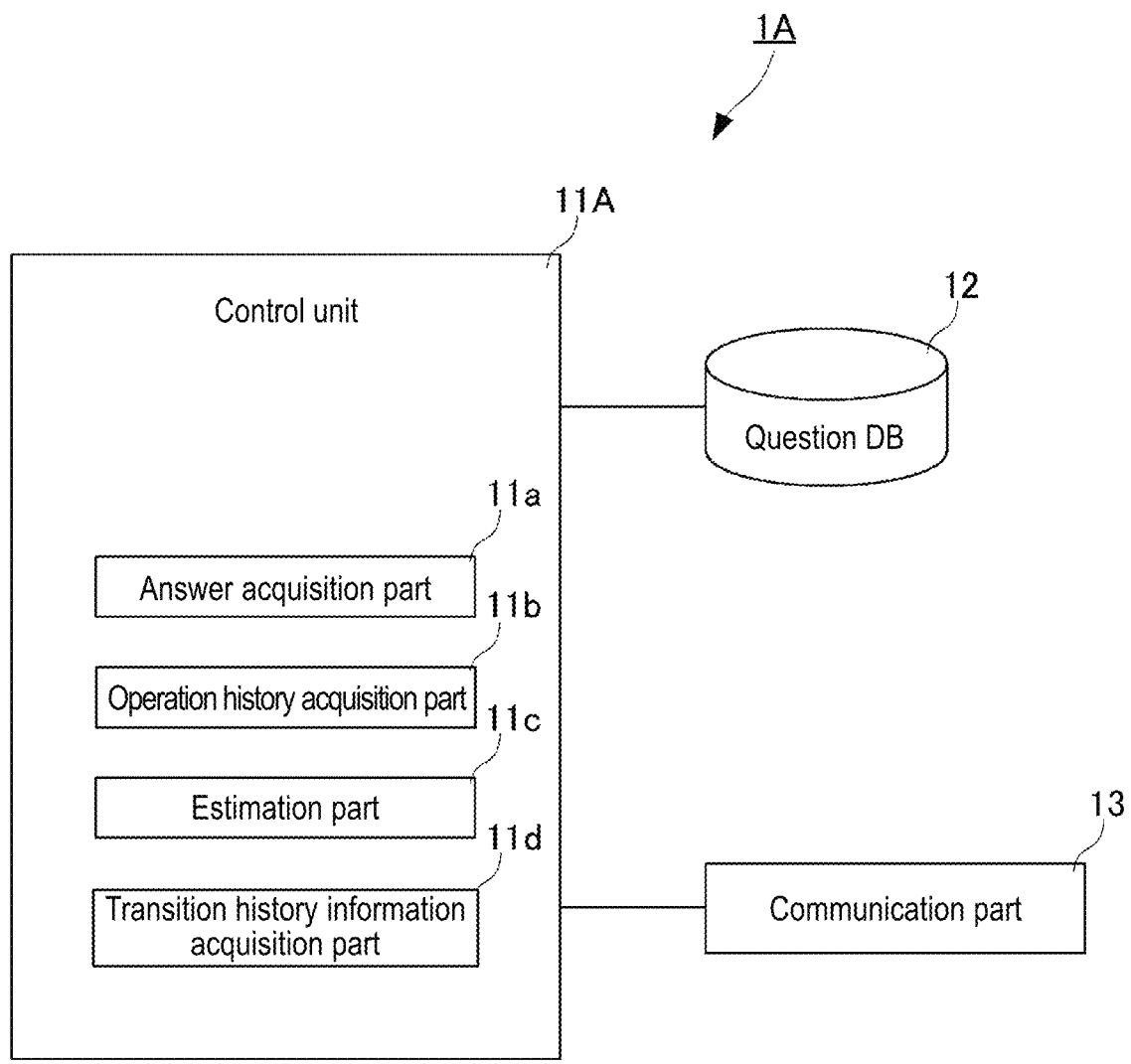
FIG. 11 is a block diagram showing the configuration of the main parts of the server device in Modification Example 2.

FIG. 11 is a block diagram showing the configuration of the main parts of the server device in Modification Example 2. In FIG. 11, the same components as those in FIG. 3 are denoted by the same reference numerals. The network system to which the server device 1A of this Modification Example is applied also has the configuration shown in FIG. 1, similar to the above example. Moreover, the user terminal 2 of this Modification Example 2 has the same configuration as the above example.

The server device 1A of this Modification Example 2 differs from the above example in that the control unit 11A includes a transition history information acquisition part 11d. The transition history information acquisition part 11d extracts the input operation information in which the window related to the CBT is changed from an active state to an inactive state or the input operation information in which the window related to the CBT is changed from an inactive state to an active state from the operation history information acquired by the operation history acquisition part 11b.

Further, the estimation part 11c estimates whether there is a high possibility that the user has been cheating, based on the number of pieces of input operation information (the input operation information in which the window related to the CBT is changed from an active state to an inactive state or the input operation information in which the window related to the CBT is changed from an inactive state to an active state) extracted by the transition history information acquisition part 11d. Specifically, in the case where the number of pieces of the input operation information extracted by the transition history information acquisition part 11d exceeds a threshold value, that is, when it is estimated that a window other than the window related to the CBT are activated frequently, the estimation part 11c estimates that there is a high possibility that the user has been cheating.

Figure 12:
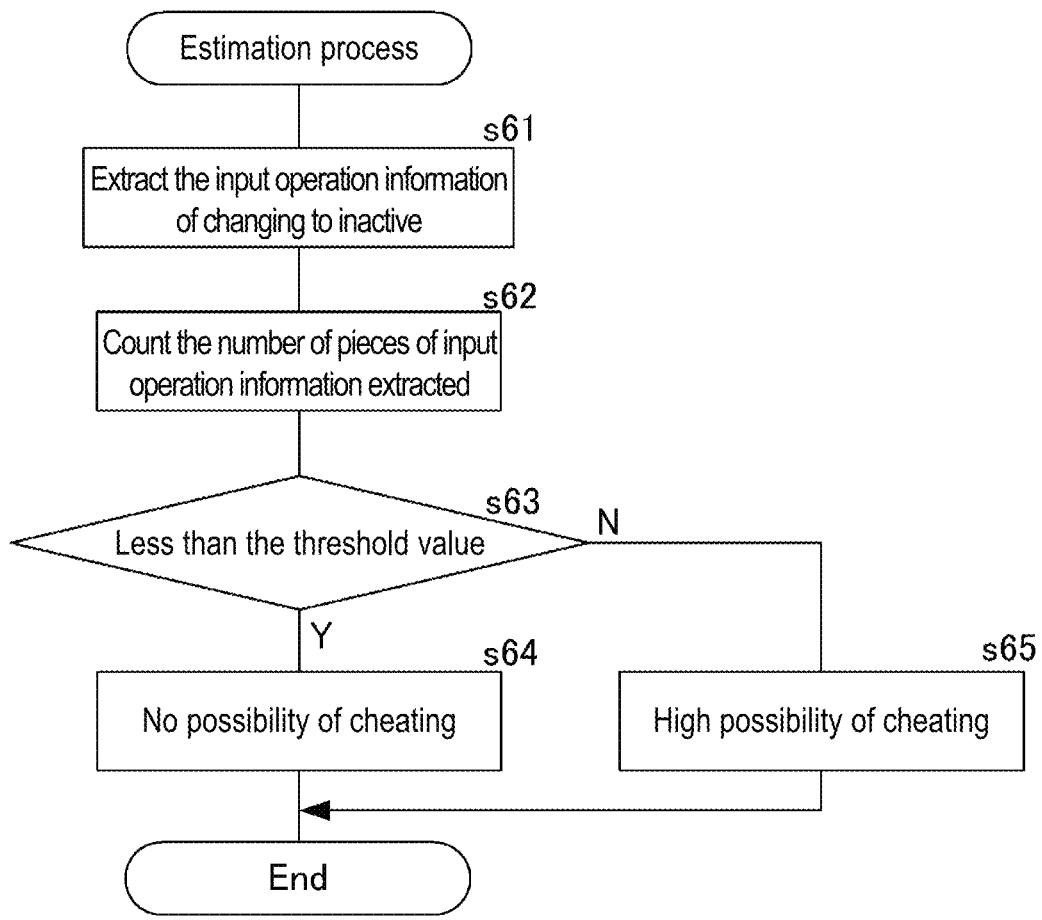
FIG. 12 is a flowchart showing an estimation process in Modification Example 2.

Also, in this Modification Example 2, the user terminal 2 performs the process shown in FIG. 8. Further, the server device 1 performs the process shown in FIG. 9, but differs from the above example in that the estimation process in s5 is not the process shown in FIG. 10 but the process shown in FIG. 12. FIG. 12 is a flowchart showing an estimation process of the server device in Modification Example 2.

The transition history information acquisition part 11d refers to the operation history information acquired in s4 and extracts the input operation information in which the window related to the CBT is changed from an active state to an inactive state (s61). In this example, although the input operation information in which the window related to the CBT is changed from an active state to an inactive state is extracted in s61, the process of s61 may also be a process of extracting the input operation information in which the window related to the CBT is changed from an inactive state to an active state.

The estimation part 11c counts the number of pieces of input operation information (the input operation information in which the window related to the CBT is changed from an inactive state to an active state) extracted in s61 by the transition history information acquisition part 11d (s62). The estimation part 11c judges whether the number of pieces of input operation information counted in s62 is less than a preset threshold value (s63).

When it is determined in s63 that the value is less than the threshold value, the estimation part 11c estimates that there is no possibility that the user has been cheating (s64), and ends this process. On the other hand, when it is determined in s63 that the value is not less than the threshold value, the estimation part 11c estimates that there is a high possibility that the user has been cheating (s65), and ends this process.

In this way, a user who frequently activates a window other than the window related to the CBT is a user who frequently references a window other than the window related to the CBT. In other words, a user who frequently activates a window other than the window related to the CBT is likely to have referred to a web page searched with a Web browser or a saved file (a file for cheating), etc. The server device 1A in this Modification Example 2 estimates that a user who is more likely to have referred to a web page searched with a Web browser or a saved file (a cheating file) is likely to have been cheating.

Thus, the network system in this Modification Example 2 may also monitor cheating using a Web browser installed in the user terminal 2 and cheating using files stored in the information processing device. In addition, the CBT may be conducted in a form that allows test takers to use their own terminals (user terminals 2), thereby reducing the cost of implementing the CBT.

Modification Example 3

Figure 13:
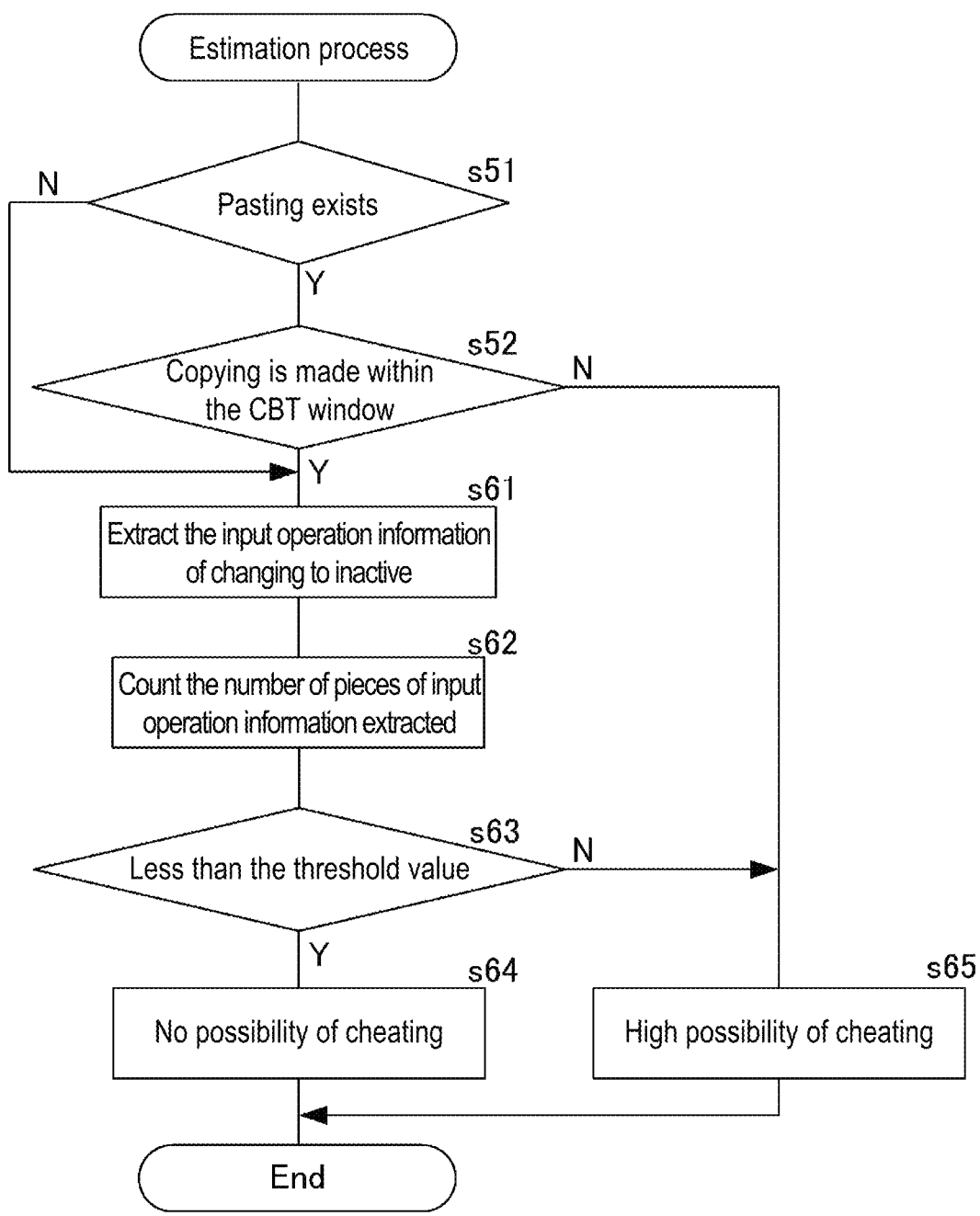
FIG. 13 is a flowchart showing an estimation process in Modification Example 3.

Moreover, the estimation processes shown in FIG. 10 and FIG. 12 may be combined to estimate whether there is a high possibility that the user has been cheating. FIG. 13 is a flowchart showing an estimation process in Modification Example 3. In FIG. 13, the same processes as those shown in FIG. 10 or FIG. 12 are denoted by the same step numbers. In the estimation process in this Modification Example 3, in the case where it is determined in s51 that there is no character string input by a paste operation or in the case where it is determined in s52 that the copy of the character string input by a paste operation is made within the window related to the CBT, the processes related to s61 to s65 are performed.

Further, in the case where it is determined in s52 that the copy of the character string input by a paste operation is not made within the window related to the CBT, it is estimated in s65 that there is a high possibility that the user has been cheating, without performing the processes related to s61 to s63.

It is noted that, in FIG. 13, although the example above shows a case where the process related to s51 and s52 is performed before the process related to s61 to s63, it may be configured such that when the process related to s61 to s63 is performed and it is determined in s63 that the value is less than the threshold value, then the process related to s51 and s52 is performed.

Modification Example 4

In the above example, it is assumed that the estimation process shown in FIG. 10, FIG. 12, or FIG. 13 is performed by the server devices 1 and 1A, but it may also be performed by the user terminal 2. In this case, the estimation part 11c and the transition history information acquisition part 11d of the server device 1 and 1A may be provided in the control unit 21 of the user terminal 2. Further, in this case, the operation history information generation part 21b corresponds to the operation history information acquisition part in the disclosure.

The disclosure is not limited to the embodiment described above as is and can be embodied by modifying the constituent elements within a range not departing from the gist of the disclosure in an implementation stage. Further, various inventions can be formed by appropriately combining a plurality of constituent elements disclosed in the embodiment described above. For example, some constituent elements may be omitted from the entire constituent elements illustrated in the embodiment. Furthermore, the constituent elements of different embodiments may be combined appropriately. Moreover, the order of each step in the flowcharts described in the above examples is merely an example, and may be changed as appropriate within a possible range.

Furthermore, the correspondence relationship between the configuration according to the disclosure and the configurations according to the above-described embodiments can be described as the following appendix.

APPENDIX

Appendix 1

A cheating estimation device (1), comprising:
an answer acquisition part (11a), acquiring a character string input into an answer column of a question as an answer;
an operation history information acquisition part (11b), acquiring operation history information indicating an operation history of an input operation of the answer to the answer column; and
an estimation part (11c), estimating whether cheating has been committed in the answer to the question based on the operation history information acquired by the operation history information acquisition part (11b).

Appendix 2

The cheating estimation device (1) according to Appendix 1, wherein the estimation part (11c) detects a character string input by a paste operation in the answer column based on the operation history information acquired by the operation history information acquisition part (11b) and estimates whether the input of the character string detected is conducted by cheating.

Appendix 3

The cheating estimation device (1) according to Appendix 2, wherein the estimation part (11c) estimates that cheating has been committed in the answer to the question when the character string input by the paste operation in the answer column is not a character string copied within a window presenting the question.

Appendix 4

The cheating estimation device (1) according to Appendix 2 or 3, wherein the estimation part (11c) estimates that cheating has been committed in the answer to the question when the character string input by the paste operation in the answer column is not a character string that exists within a window presenting the question.

Appendix 5

The cheating estimation device (1A) according to any one of Appendices 1 to 4, comprising:
a transition history information acquisition part (11d), acquiring transition history information indicating a transition history in which a window presenting the question transitioned between an active state where the window is being focused and an inactive state where the window is out of focus, and
the estimation part (11c) further estimating whether cheating has been committed in the answer to the question using the transition history information acquired by the transition history information acquisition part (11d).

Appendix 6

The cheating estimation device (1A) according to Appendix 5, wherein the estimation part (11c) estimates whether cheating has been committed in the answer to the question by comparing a frequency at which the window presenting the question transitions from the active state to the inactive state or from the inactive state to the active state with a preset threshold value.

Appendix 7

A cheating estimation device (1A), comprising:
an answer acquisition part (11a), acquiring a character string input into an answer column of a question as an answer;
a transition history information acquisition part (11d), acquiring transition history information indicating a transition history in which a window presenting the question transitioned between an active state where the window is being focused and an inactive state where the window is out of focus; and
an estimation part (11c), estimating whether cheating has been committed in the answer to the question based on the transition history information acquired by the transition history information acquisition part.

What is claimed is:
1. A cheating estimation device, comprising:
a processor, configured to:
acquire a character string, detected by a user terminal, input into an answer column of a question as an answer;
acquire operation history information, detected by a user terminal, indicating an operation history of an input operation of the answer to the answer column;
acquire transition history information, detected by a user terminal, indicating a transition history in which a window presenting the question transitioned between an active state where the window is being focused and an inactive state where the window is out of focus;

determine whether the input operation of the answer to the answer column is a paste operation;

in response to the input operation being the paste operation, determine whether a copy operation that copies the answer to the answer column is made prior to the paste operation;

in response to the copy operation being made prior to the paste operation in the active state where the window is being focused, determine that cheating has not been committed in the answer to the question; and in response to the copy operation being made prior to the paste operation in the in active state where the window is out of focused, determine that cheating has been committed in the answer to the question.

2. The cheating estimation device according to claim 1, wherein the processor detects a character string input by a paste operation in the answer column based on the operation history information and determines whether the input of the character string detected is conducted by cheating.

3. The cheating estimation device according to claim 2, wherein the processor determines that cheating has been committed in the answer to the question when the character string input by the paste operation in the answer column is not a character string copied within a window presenting the question.

4. The cheating estimation device according to claim 2, wherein the processor determines that cheating has been committed in the answer to the question when the character string input by the paste operation in the answer column is not a character string that exists within a window presenting the question.

5. The cheating estimation device according to claim 1, wherein the processor determines whether cheating has been committed in the answer to the question by comparing a frequency at which the window presenting the question transitions from the active state to the inactive state or from the inactive state to the active state with a preset threshold value.

6. A cheating estimation method executed by a computer, comprising:

acquiring a character string, detected by a user terminal, input into an answer column of a question as an answer;

acquiring operation history information, detected by a user terminal, indicating an operation history of an input operation of the answer to the answer column;

acquiring transition history information, detected by a user terminal, indicating a transition history in which a window presenting the question transitioned between an active state where the window is being focused and an inactive state where the window is out of focus;

determining whether the input operation of the answer to the answer column is a paste operation;

in response to the input operation being the paste operation, determining whether a copy operation that copies the answer to the answer column is made prior to the paste operation;

in response to the copy operation being made prior to the paste operation in the active state where the window is being focused, determining that cheating has not been committed in the answer to the question; and in response to the copy operation being made prior to the paste operation in the in active state where the window is out of focused, determining that cheating has been committed in the answer to the question.

7. A non-transitory computer-readable recording medium, recording a cheating estimation program executed by a computer, comprising:

acquiring a character string, detected by a user terminal, input into an answer column of a question as an answer;

acquiring operation history information, detected by a user terminal, indicating an operation history of an input operation of the answer to the answer column;

acquiring transition history information, detected by a user terminal, indicating a transition history in which a window presenting the question transitioned between an active state where the window is being focused and an inactive state where the window is out of focus;

determining whether the input operation of the answer to the answer column is a paste operation;

in response to the input operation being the paste operation, determining whether a copy operation that copies the answer to the answer column is made prior to the paste operation;

in response to the copy operation being made prior to the paste operation in the active state where the window is being focused, determining that cheating has not been committed in the answer to the question; and in response to the copy operation being made prior to the paste operation in the in active state where the window is out of focused, determining that cheating has been committed in the answer to the question.

* * * * *